(12) United States Patent
Hendriks et al.

(10) Patent No.: US 7,515,348 B2
(45) Date of Patent: Apr. 7, 2009

(54) ZOOM OPTICAL SYSTEM

(75) Inventors: Bernardus H. W. Hendriks, Eindhoven (NL); Stein Kuiper, Vught (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 139 days.

(21) Appl. No.: 10/596,761

(22) PCT Filed: Jan. 5, 2005

(86) PCT No.: PCT/IB2005/050041

§ 371 (c)(1),
(2), (4) Date: Jun. 23, 2006

(87) PCT Pub. No.: WO2005/069042

PCT Pub. Date: Jul. 28, 2005

(65) Prior Publication Data

US 2007/0153399 A1    Jul. 5, 2007

(30) Foreign Application Priority Data

Jan. 7, 2004 (EP) .................................. 04100025
Mar. 22, 2004 (GB) .................................. 0406337.6

(51) Int. Cl.
*G02B 3/12* (2006.01)

(52) U.S. Cl. ........................ 359/665; 359/666; 359/667

(58) Field of Classification Search ................ 359/228, 359/250, 253, 254, 358, 509, 665–667, 832; 396/529; 349/193, 200
See application file for complete search history.

(56) References Cited

U.S. PATENT DOCUMENTS

| 6,081,388 A | * | 6/2000 | Widl | 359/666 |
| 6,369,954 B1 | * | 4/2002 | Berge et al. | 359/666 |
| 6,473,543 B2 | * | 10/2002 | Bartels | 385/16 |
| 6,702,483 B2 | * | 3/2004 | Tsuboi et al. | 396/449 |
| 2001/0017985 A1 | | 8/2001 | Tsuboi et al. | |

FOREIGN PATENT DOCUMENTS

| WO | 03069380 A1 | 8/2003 |
| WO | 2004038480 A1 | 5/2004 |

* cited by examiner

*Primary Examiner*—Joseph Martinez

(57) ABSTRACT

A zoom optical system is provided which has a lens system which comprises a first lens which is arranged to provide a continuously variable focus for a beam of radiation. The lens system further comprises a switchable optical element including a first fluid, a second fluid and a wavefront modifier having a part through which said radiation beam is arranged to pass. In a first mode the switchable optical element has a first fluid configuration with said part being substantially covered by the first fluid, and in a second mode the switchable optical element has a second, different, fluid configuration with said part being substantially covered by the second fluid.

13 Claims, 7 Drawing Sheets

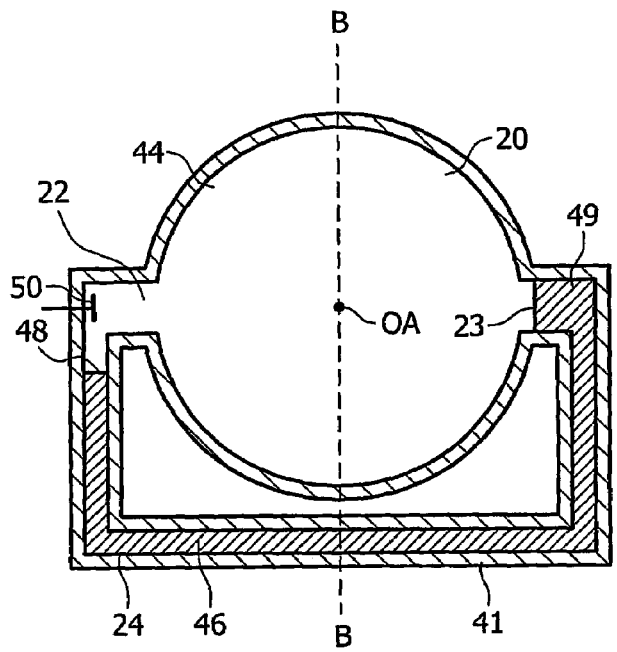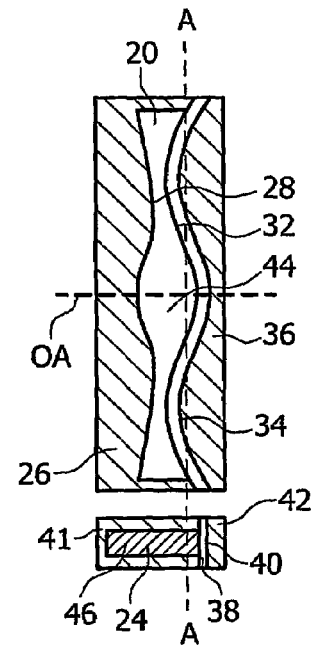
FIG. 6  FIG. 7
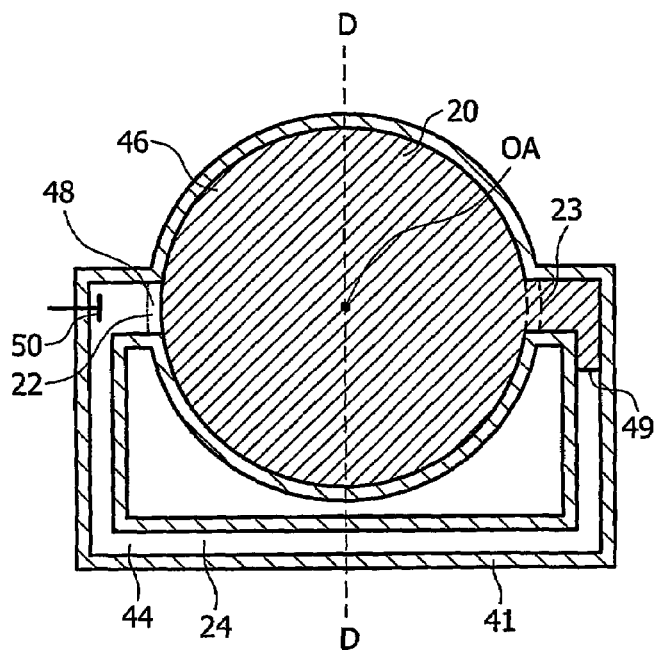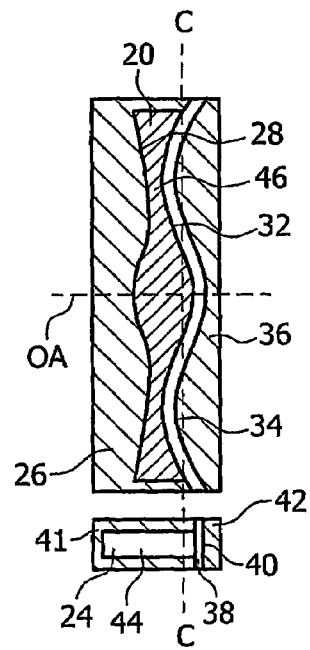
FIG. 8  FIG. 9

ZOOM OPTICAL SYSTEM

TECHNICAL FIELD

The present invention relates to a zoom optical system, particularly but not exclusively for use in an image capturing apparatus.

BACKGROUND ART

Often when capturing an image of an object using an image capturing apparatus, for example a camera, it is desirable to be able to change a zoom setting for the image. With the distance between the camera and the object remaining constant, a high zoom factor allows an image of the object to be captured at a high level of magnification and a narrow field of view. A low zoom factor allows an image of the object to be captured at a low level of magnification and a wide field of view. In the example of a camera the high zoom factor is characteristic of a telephoto lens setting and the low zoom factor is characteristic of a wide-angle lens setting.

Different zoom factors require different effective focal lengths of a zoom optical system. For a telephoto lens setting the effective focal length is relatively long and for a wide-angle lens setting the effective focal length is relatively short.

In order for images to be captured with different zoom settings it is preferable that the effective focal length of a zoom optical system of the camera must be variable whilst keeping the image of the object in focus. Such a zoom optical system may be constructed using at least two lenses which provide a variable focus.

A known zoom optical system comprises an array of solid lenses which lie along a common light path. By varying positions of these lenses along the light path, different effective focal lengths can be obtained whilst keeping the image in focus, thus allowing images having different zoom settings to be captured. Zoom optical systems of this type are however relatively bulky and mechanically complex. Movement of the different lenses may be performed either manually or automatically, but these methods are typically relatively expensive and lacking in robustness. The range of zoom factors provided by such a zoom optical system depends on parameters including the focal power of the individual lenses and the distances between the lenses along the light path which can be achieved. An increase in an upper limit of the zoom factor range of a zoom optical system of this type will generally increase the bulk and complexity of the zoom optical system.

Rather than one zoom optical system providing both a telephoto and a wide-angle zoom function, it is often necessary to swap the lenses of a camera between a telephoto and a wide-angle system in order to obtain a range of different zoom factors. This is a relatively slow and inconvenient process and requires a camera user to carry different lenses in addition to the camera.

International patent application WO 03/069380 describes a fluid meniscus lens. This lens comprises a fluid meniscus which separates a first fluid and a second fluid and which has a curvature. By varying this curvature it is possible to change the focal length of the lens and the focus of an image. In applications where the lens is to be used in various orientations, the fluids are preferably density matched to avoid unwanted gravitational effects. Therefore, two liquids, such as oil and water, which are density matched are used.

Two such fluid meniscus lenses could be incorporated in a zoom optical system in order to capture images having different zoom factors. To achieve a large range in zoom factor requires a large optical power change in each the fluid menisci. Since the refractive indices of the two liquids are not greatly different, and because the extent to which the curvature may be varied is limited, the optical power range of the fluid meniscus lenses is relatively small. This imposes a limit on the possible zoom factor range provided by the zoom optical system. In particular, one lens component in a zoom lens system (typically that closest the image capture device) requires the greatest optical power range during zooming, so the amount of zooming is constrained by the relatively limited optical power range of the fluid meniscus lens used as that one lens component.

STATEMENT OF INVENTION

It is an object of the present invention to provide a zoom optical system having improvements to the zoom function for a captured image whilst reducing the need for mechanical components in the optical system.

In accordance with the present invention there is provided a zoom optical system comprising a lens system which is arranged to provide a variable zoom setting for a beam of radiation, wherein the lens system comprises a switchable optical element having a first mode and a second mode, characterized in that the element including a first fluid, a second fluid and a wavefront modifier having a part through which said radiation beam is arranged to pass, wherein in the first mode the switchable optical element has a first fluid configuration in which said part is substantially covered by the first fluid, and in the second mode the switchable optical element has a second, different, fluid configuration in which said part is substantially covered by the second fluid.

A zoom optical system may be produced according to the present invention which is relatively simple, compact, inexpensive and robust.

The zoom optical system preferably has a first effective focal length in the first fluid configuration and a second effective focal length in the second fluid configuration, wherein said first and second effective focal lengths are each arranged to provide a different zoom setting.

With the optical element being in the first mode, the lens system has a first optical zoom setting. With the optical element being in the second mode, the lens system has a second optical zoom setting in which the zoom factor is increased.

In an embodiment of the present invention the lens system preferably comprises a further switchable optical element which is arranged to operate in cooperation with the switchable optical element to provide at least part of the variable zoom setting of the lens system. With the lens system comprising a further switchable optical element which operates cooperatively with the other switchable optical element, the zoom optical system is able to provide a binary zoom functionality whilst maintaining a fixed focus. By having a fixed focus, such a binary zoom optical system may be constructed which is relatively compact in size.

In a different embodiment of the invention the lens system preferably includes a first lens with a continuously variable focus. The focus of the first lens may be varied so that the image having either the first zoom setting or the second zoom setting is correctly focused. When the switch between the two zoom settings occurs, the first lens focus is also altered stepwise to provide the correct zoom function. Consequently the optical system is a binary zoom optical system having two discrete optical zoom settings.

A digital zoom function may be used in addition to provide for additional zoom factors between the two zoom settings. In one embodiment of the invention, an image capturing apparatus comprises the optical system and comprises a digital zoom system arranged to introduce a digital zoom factor to an image captured in the first mode and/or an image captured in the second mode.

Preferably the switchable optical element in the first fluid configuration is arranged to provide switchable electrowetting forces by applying a first voltage across a first and second fluid electrode, and in the second fluid configuration is arranged to provide different switchable electrowetting forces by applying a second, different, voltage across the first and a third fluid electrode.

Preferably, the first fluid is a liquid and the second fluid is gaseous. The term gaseous includes either of a gas mixed with a vapour of a liquid, or only a gas. This is possible since the two fluids do not need to be density matched, even if the device is to be used in various orientations, and has the advantage that a relatively large difference in refractive index between the two fluids is provided.

In one embodiment of the invention the first lens may be in the form of a fluid meniscus lens and the switchable optical element preferably has a maximum optical power range (between its two modes) which is greater than the maximum optical power range of the first lens. By this arrangement, the switchable optical element can be used as the lens component requiring the greatest optical power range in the lens system during zooming, so that the amount of zooming is not constrained by the relatively limited optical power range of the fluid meniscus lens.

Further features and advantages of the invention will become apparent from the following description of preferred embodiments of the invention, given by way of example only, which is made with reference to the accompanying drawings.

BRIEF DESCRIPTION OF DRAWINGS

FIGS. 6 and 7 show schematic cross-sections, along lines A—A and B—B respectively, of a switchable optical element in a first fluid configuration, in accordance with the present invention.

FIGS. 8 and 9 show schematic cross-sections, along lines C—C and D—D respectively, of the switchable optical element in a second fluid configuration, in accordance with the present invention.

SPECIFIC DESCRIPTION OF THE EMBODIMENT(S)

Figure 1:
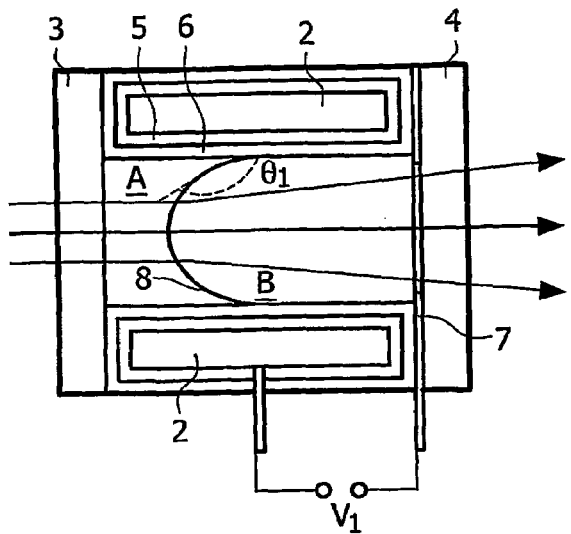
FIGS. 1 to 3 show schematically a variable focus lens in accordance with the prior art.
Figure 2:
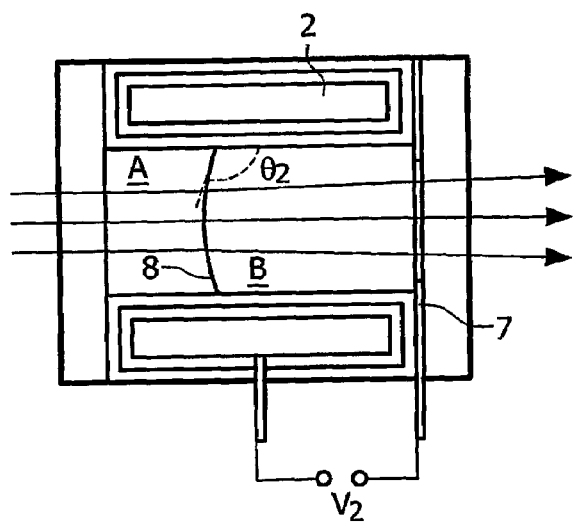
Figure 3:
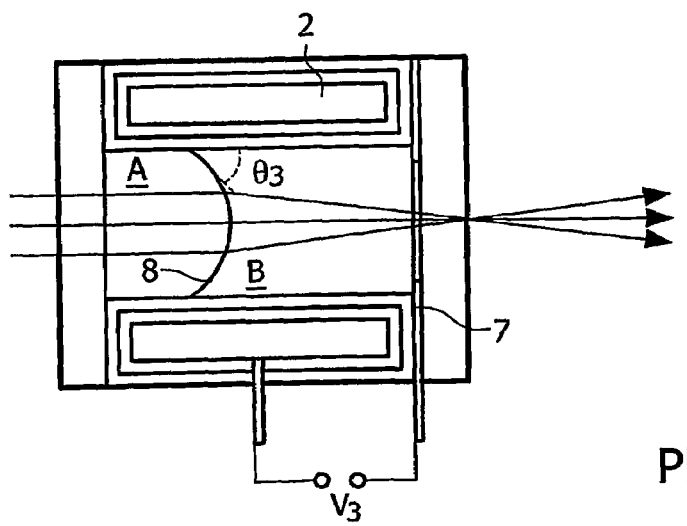

FIGS. 1 to 3 show, in accordance with the prior art, a variable focus lens which is a fluid meniscus lens comprising a cylindrical first meniscus electrode 2 forming a capillary tube, sealed by means of a transparent front element 3 and a transparent back element 4 to form a fluid chamber containing two different fluids. The first meniscus electrode 2 may be a conducting coating applied on the inner wall of a tube.

The two different fluids consist of two non-miscible liquids in the form of an electrically insulating first liquid A, such as a silicone oil or an alkane, referred to herein further as "the oil", and an electrically conducting second liquid B, such as water containing a salt solution. The two liquids are preferably arranged to have an equal density, so that the shape of the meniscus can be controlled independently of orientation, i.e. without dependence on gravitational effects between the two liquids. This may be achieved by appropriate selection of the first liquid constituent; for example alkanes or silicone oils may be modified by addition of molecular constituents to increase their density to match that of the salt solution.

Depending on the choice of the oil used, the refractive index of the oil may vary between 1.25 and 1.85. Likewise, depending on the amount of salt added, the salt solution may vary in refractive index between 1.33 and 1.60. The fluids are selected such that the first fluid A has a higher refractive index than the second fluid B.

The first meniscus electrode 2 is a cylinder of inner radius typically between 1 mm and 20 mm. The first meniscus electrode 2 is formed from a metallic material and is coated by an insulating layer 5, formed for example of parylene. The insulating layer has a thickness of between 50 nm and 100 μm, with typical values between 1 μm and 10 μm. The insulating layer is coated with a fluid contact layer 6, which reduces the hysteresis in the contact angle of the meniscus with the cylindrical wall of the fluid chamber. The fluid contact layer is preferably formed from an amorphous fluorocarbon such as Teflon™ AF1600 produced by DuPont™. The fluid contact layer 6 has a thickness of between 5 nm and 50 μm. The AF1600 coating may be produced by successive dip coating of the first meniscus electrode 2, which forms a homogeneous layer of material of substantially uniform thickness since the cylindrical sides of the first meniscus electrode 2 are substantially parallel to the cylindrical electrode; dip coating is performed by dipping the electrode whilst moving the electrode in and out of the dipping solution along its axial direction. The paralyne coating may be applied using chemical vapour deposition. The wettability of the fluid contact layer by the second fluid is substantially equal on both sides of the intersection of a meniscus 8 with the fluid contact layer 6 when no voltage is applied between the first and a second meniscus electrode 7.

The second meniscus electrode 7 is annular and is arranged at one end of the fluid chamber, in this case, adjacent the back element. The second meniscus electrode 7 is arranged with at least one part in the fluid chamber such that the electrode acts on the second fluid B.

The two fluids A and B are non-miscible so as to tend to separate into two fluid bodies separated by the fluid meniscus 8 having a curvature. When no voltage is applied between the first and second meniscus electrodes, the fluid contact layer has a higher wettability with respect to the first fluid A than the second fluid B. Due to meniscus electrowetting forces, the wettability by the second fluid B varies under the application of a voltage between the first meniscus electrode 2 and the second meniscus electrode 7, which tends to change the contact angle of the meniscus at the three phase line (the line of contact between the fluid contact layer 6 and the two liquids A and B). The variable focus of the fluid meniscus lens comprises variations in the fluid meniscus curvature which is variable in dependence on the applied voltage.

Referring now to FIG. 1, when a low voltage $V_1$, e.g. between 0 V and 20 V, is applied between the meniscus electrodes the meniscus adopts a first concave meniscus shape. In this configuration, the initial contact angle $\theta_1$ between the meniscus and the fluid contact layer 6, measured in the fluid B, is for example approximately 140°. Due to the higher refractive index of the first fluid A than the second fluid B, the lens formed by the meniscus, here called meniscus lens, has a relatively high negative power in this configuration.

To reduce the concavity of the meniscus shape, a higher magnitude of voltage is applied between the first and second meniscus electrodes. Referring now to FIG. 2, when an intermediate voltage $V_2$, e.g. between 20 V and 150 V, depending on the thickness of the insulating layer, is applied between the meniscus electrodes the meniscus adopts a second concave meniscus shape having a rate of curvature increased in comparison with the meniscus in FIG. 1. In this configuration, the intermediate contact angle $\theta_2$ between the first fluid A and the fluid contact layer 6 is for example approximately 100°. Due to the higher refractive index of the first fluid A than the second fluid B, the meniscus lens in this configuration has a relatively low negative power.

To produce a convex meniscus shape, a yet higher magnitude of voltage is applied between the first and second meniscus electrodes. Referring now to FIG. 3, when a relatively high voltage $V_3$, e.g. 150 V to 200 V, is applied between the meniscus electrodes the meniscus adopts a meniscus shape in which the meniscus is convex. In this configuration, the maximum contact angle $\theta_3$ between the first fluid A and the fluid contact layer 6 is for example approximately 60°. Due to the higher refractive index of the first fluid A than the second fluid B, the meniscus lens in this configuration has a positive power.

Note that, whilst achieving the configuration of FIG. 3 is possible using a relatively high power, it is preferred that a device including the lens as described is adapted to use only low and intermediate powers in the ranges described, that is to say that the voltage applied is restricted such that the electrical field strength in the insulating layer is smaller than 20 V/μm, and excessive voltages causing charging of the fluid contact layer, and hence degradation of the fluid contact layer, are not used.

Note furthermore that the initial, low voltage, configuration will vary in dependence on the selection of the liquids A and B, in dependence on their surface tensions). By selecting an oil with a higher surface tension, and/or by adding a component, such as ethylene glycol, to the salt solution which reduces its surface tension, the initial contact angle can be decreased; in this case the lens may adopt a low optical power configuration corresponding to that shown in FIG. 2, and an intermediate power configuration corresponding to that shown in FIG. 3. In any case, the low power configuration remains such that the meniscus is concave, and a relatively wide range of lens powers can be produced without using an excessive voltage.

Figure 4:
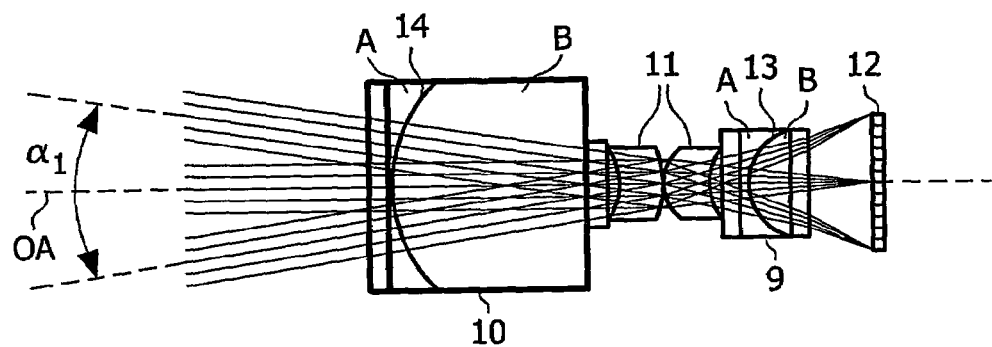
FIGS. 4 and 5 show a zoom optical system, not in accordance with the present invention, comprising two fluid meniscus lenses.
Figure 5:
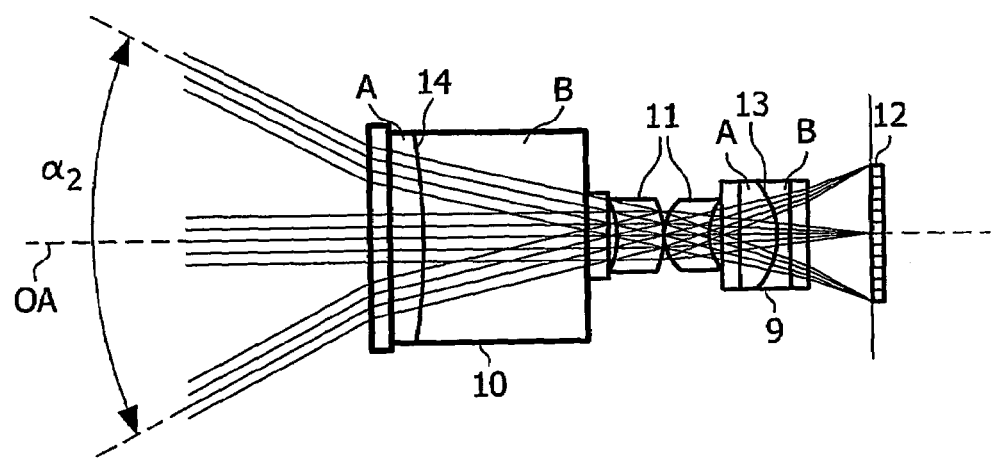

FIGS. 4 and 5 show a zoom optical system which could be arranged to comprise two of the fluid meniscus lenses described using FIGS. 1 to 3.

In the optical system shown a first fluid meniscus lens 9 and a second fluid meniscus lens 10 are arranged along an optical axis OA. Also on the optical axis OA and between the first and the second fluid meniscus lenses 9, 10 is a plurality of optical elements 11 which aid a wavefront modification of a given radiation beam travelling along the optical axis OA. The optical system is arranged to capture an image of a given object which is an image scene. An image detector 12 is arranged to detect an image of the image scene following a focusing function and an introduction of a zoom factor to the given radiation beam carrying the image by the first and second fluid meniscus lenses 9, 10. In this example the image detector 12 is a charged coupled device (CCD).

Referring to FIG. 4 showing the optical system at one limit of the zoom range, and viewing along the optical axis OA, the optical system has a first field of view $\alpha_1$, the first fluid meniscus lens 9 has a fluid meniscus 13 which is concave and the second fluid meniscus lens 10 has a fluid meniscus 14 which is concave. FIG. 4 illustrates a zoom setting, at a highest limit of a zoom factor range of the optical system, introduced by the optical system to a captured image of the image scene. The image is captured by the CCD 12.

Referring to FIG. 5 and viewing along the optical axis OA from the image scene which has a second field of view $\alpha_2$ of a field of view to the CCD, the first fluid meniscus lens 9 has a fluid meniscus 13 which is convex and the second fluid meniscus lens 10 has a fluid meniscus 14 which convex. FIG. 5 illustrates a zoom setting, at a lowest limit of the zoom factor range of the optical system, introduced by the optical system to a captured image of the object.

The zoom factor of the optical system shown in FIGS. 4 and 5 is limited. In a typical arrangement, the zoom factor at the highest limit is approximately 2 times greater than that of the image captured at the lowest zoom setting. Consequently the upper limit in zoom factor difference is approximately two times, which is relatively small.

Referring to FIGS. 6 to 7, a switchable optical element in accordance with an embodiment of the present invention includes a chamber 20, fluidly connected via two openings 22, 23 of the chamber to a conduit 24 having two opposite ends. The first opening 22 of the chamber is fluidly connected to the first end of the conduit and the second opening 23 of the chamber is fluidly connected to the second end of the conduit so as to form a fluid-tight enclosure for a fluid system. One side of the chamber 20 is enclosed by a wavefront modifier 26 with a part 28 having a face exposed to the interior of the chamber 20. The wavefront modifier is formed from a transparent material, for example Zeonex™ which is a cyclo-olefin copolymer (COC) which is non-soluble in aqueous liquids. This may for example be formed by an injection moulding process. The face of the part 28 of the wavefront modifier 26 is substantially aspherical and rotationally symmetric about an optical axis OA.

The chamber 20 is further enclosed by a cover plate which comprises a further wavefront modifier 36, which is formed from a transparent material, similarly for example Zeonex™ and has a different part 32. The different part 32 is covered in a hydrophobic fluid contact layer which is transparent and formed for example of Teflon™ AF1600 produced by DuPont™. One surface of this hydrophobic fluid contact layer is exposed to the interior of the chamber 20.

The different part 32 has a face which is aspherical and rotationally symmetric about the optical axis OA. The face of the different part 32 has a differently aspherical curvature to an aspherical curvature of the face of the part 28.

A given radiation beam travelling along the optical axis OA is arranged to pass through the part 28 and the different part 32. The wavefront modifier 26 is adapted to perform a first wavefront modification and the further wavefront modifier 36 is adapted to perform a second, different, wavefront modification on the given radiation beam. The second wavefront modification is arranged to complement the first wavefront modification.

A common, first fluid electrode 50 formed for example from a metal, is located in the conduit 24 near to one opening 22 of the chamber.

A second fluid electrode 34 lies between the cover plate 36 and the hydrophobic fluid contact layer. This second fluid electrode 34 is formed as a sheet of a transparent electrically conducting material, for example indium tin oxide (ITO). An insulating layer (not shown), formed for example of parylene, may be formed between the fluid contact layer and the second fluid electrode 34. It is to be noted that the second electrode 34 has an operative area which completely overlaps with the area occupied by the face of the part 28 of the wavefront modifier 26. The hydrophobic fluid contact layer has a surface area which completely overlaps the face of the part 28 of the wavefront modifier.

The enclosed fluid system comprises a first fluid 44 and a second fluid 46. The first fluid 44 comprises a polar and/or an electrically conductive fluid. In this example the first fluid 44 is a liquid and is salted water, having a predetermined first refractive index of approximately 1.37. The salted water has a lower freezing point than that of non-salted water. The second fluid in this example is preferably gaseous and comprises air which has a second, different, refractive index of approximately 1. In this example the air is mixed with a saturated vapour of the salted water 44 and a refractive index difference between the refractive index of the first fluid and the second fluid is approximately 0.4. In a different example the first fluid 44 is an approximately 65% by weight aqueous solution of KSCN having a refractive index of approximately 1.49 and having a refractive index difference from the second fluid 46 of approximately 0.5. In further examples where the first fluid 44 is a polar organic liquid such as aniline or anatabine, having a refractive index of approximately 1.59 or 1.57 respectively, the refractive index difference between the first fluid and the second fluid is approximately 0.6. An advantage of the second fluid being air is that if the switchable optical element when manufactured is not air-tight, performance of the element will not be substantially reduced. The first fluid 44 and the second fluid 46 lie in contact with each other at two fluid menisci 48, 49.

In a first fluid configuration of the switchable optical element, as illustrated by FIGS. 6 and 7, the first fluid 44 substantially fills the chamber 20 and a portion of the conduit 24. By substantially filling, it is meant that the first fluid 44 covers at least most of the part 28 of the wavefront modifier 26 and at least most of the different part 32 of the further wavefront modifier 36. In this first fluid configuration, the first fluid lies in contact with at least most of the exposed surface of the hydrophobic fluid contact layer in the chamber. The first fluid electrode 50 lies in contact with the portion of the conduit filled by the first fluid 44.

The conduit 24 is formed between conduit walls 41 and a conduit cover plate 42. The conduit cover plate is covered by a hydrophobic fluid contact layer 38 exposed on one surface to the interior of the conduit 24, the hydrophobic fluid contact layer being formed for example of AF1600™. A third fluid electrode 40 lies between the conduit cover plate 42 and the hydrophobic fluid contact layer 38. This electrode is formed from an electrically conductive material, for example indium tin oxide (ITO). It is to be noted that the third fluid electrode 40 has a surface area which overlaps with most of the interior of the conduit 24.

In the first fluid configuration of the element, the second fluid 46 substantially fills the conduit 24 except for the portion filled by the first fluid 44 which is in contact with the common, first fluid electrode 50.

In a second fluid configuration of the switchable optical element, as illustrated by FIGS. 8 and 9, the first fluid 44 substantially fills the conduit 24. In this second fluid configuration the first fluid 44 continues to lie in contact with the common first fluid electrowetting electrode 50 located in the previously described portion of the conduit. The first fluid 44 now lies in contact with the hydrophobic fluid contact layer 38 of the conduit. The second fluid 46 now substantially fills the chamber 20 such that the second fluid 46 covers at least most of the part 28 of the wavefront modifier 26 and at least most of the different part 32 of the further wavefront modifier 36. Additionally a portion of the conduit 24 is filled by the second fluid 46. This portion of the conduit 24 is at the opposite end to the portion in which the common, first fluid electrode 50 is located. In the second fluid configuration the first fluid electrode 50 lies in contact with the first fluid 44 which fills the portion of the conduit 24.

A fluid switching system (not shown) is connected to the common first fluid electrode, the second fluid electrode and the third fluid electrode. The fluid switching system acts upon the switchable optical element and is arranged to switch the first and the second fluid configurations. In the first fluid configuration the fluid switching system is arranged to apply a voltage $V_1$ of an appropriate value across the common, first fluid electrode 50 and the second fluid electrode 34. The applied voltage $V_1$ provides switchable electrowetting forces such that the switchable optical element of the present invention tends to adopt the first fluid configuration wherein the electrically conductive first fluid 44, moves to substantially fill the chamber 20. As a result of the applied voltage $V_1$, the hydrophobic fluid contact layer of the chamber 20 temporarily becomes at least relatively hydrophilic in nature, thus aiding the preference of the first fluid 44 to substantially fill the chamber 20. It is envisaged that whilst in the first fluid configuration, no voltage is applied across the common, first electrode 50 and the third electrowetting electrode 40, such that the fluid contact layer in the conduit remains relatively highly hydrophobic.

In order to switch between the first fluid configuration and the second fluid configuration of the switchable optical element, the fluid switching system switches off the applied voltage $V_1$ and applies a second applied voltage $V_2$ of an appropriate value across the common, first fluid electrode 50 and the third fluid electrode 40. No voltage is applied across the common, first fluid electrode 50 and the second fluid electrode 34.

The switchable optical element now lies in the second fluid configuration state, in which the first fluid 44 substantially fills the conduit 24 as a result of switchable electrowetting forces provided by the applied voltage $V_2$. With the applied voltage $V_2$ the hydrophobic fluid contact layer 38 of the conduit 24 is now at least relatively hydrophilic and tends to attract the first fluid 44. The first fluid 44 moves to fill the portion of the conduit 24 in which the common first fluid electrode 50 is located. As earlier described, the second fluid 46 now substantially fills the chamber 20. The hydrophobic fluid contact layer of the chamber 20 is now relatively highly hydrophobic and aids this arranging of the second fluid in the second fluid configuration.

During the transition between the first and the second fluid configurations of the element, as controlled by the fluid switching system, the first and second fluids 44, 46 of the fluid system flow in a circulatory manner through the fluid system, each of the fluids displacing each other. In this circulatory fluid flow during the transition from the first to the second fluid configuration, the first fluid 44 passes out of the chamber 20 into one end of the conduit 24 via one opening 22 of the chamber. Simultaneously the second fluid 46 passes from the other end of the conduit 24 into the chamber 20 via the other opening 23 of the chamber. During the transition, from the second to the first fluid configuration, an opposite circulatory fluid flow occurs.

Thus, when changing from the first fluid configuration to the second fluid configuration, the applied voltage $V_2$ across the third fluid electrode 40 and the common, first fluid electrode 50 attracts the electrically conductive first fluid 44 into the chamber 20, thus displacing the electrically insulating second fluid 46 out of the chamber 20. Additionally, the hydrophobic fluid contact layer 32 of the chamber 20 repels the electrically conductive first fluid 44 out of the chamber 20 into the conduit 24. The transition from the second to the first fluid configuration is the reverse of the transition from the first to the second transition state in these terms.

Figure 10:
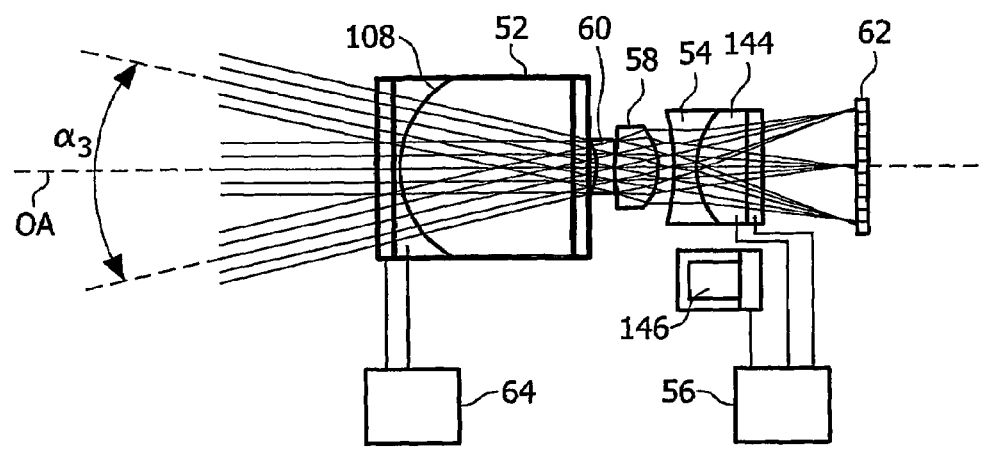
FIG. 10 shows schematically the optical system in a first mode in accordance with an embodiment of the present invention.
Figure 11:
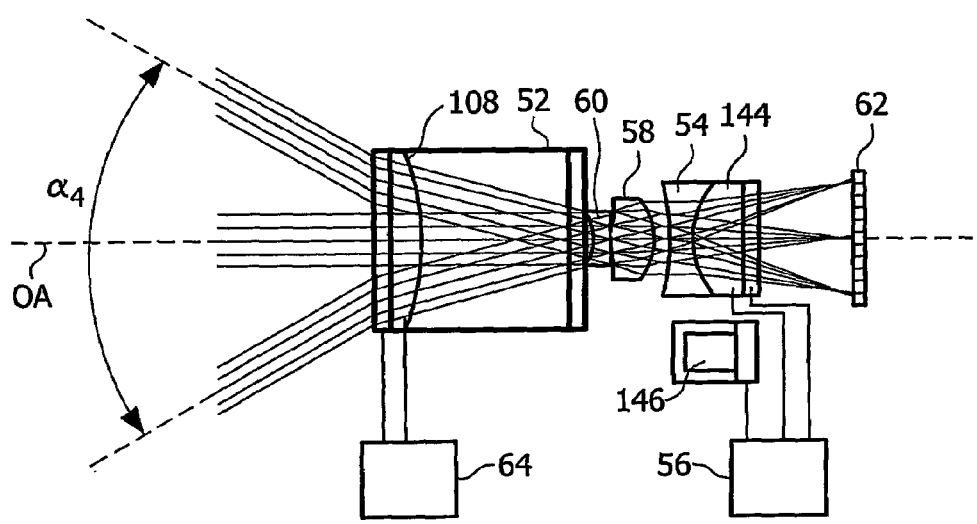
FIG. 11 shows schematically a zoom optical system in a second mode in accordance with an embodiment of the present invention.

FIG. 10 and FIG. 11 shows schematically a binary zoom optical system used in a camera in accordance with an embodiment of the present invention. FIG. 10 shows the optical system when in a first zoom mode and FIG. 11 shows the optical system when in a second, different zoom mode.

The binary zoom optical system comprises a first lens which is arranged to provide a continuously variable focus for a given radiation beam travelling along an optical axis OA. In this embodiment the first lens is a fluid meniscus lens 52 which is similar to that described using FIGS. 1 to 3. The binary zoom optical system further comprises a switchable optical element 54 which is similar to that described using FIGS. 6 to 9, and a fluid switching system 56 which is similar to that described earlier for switching the first and second configuration. Elements and features of the fluid meniscus lens 52, the switchable optical element 54 and the fluid switching system 56 are similar to those described previously. For such elements and features, similar reference numerals will be used herein, incremented with 100; corresponding descriptions should be taken to apply here also. The face of the part 128 (not indicated) and the face of the different part 132 (not indicated) are both aspherical and are arranged to provide the binary zoom optical system with an improved quality field of view of an object which has a minimised periphery distortion of a captured image of the object.

Arranged on the optical axis OA and lying between the fluid meniscus lens 52 and the switchable optical element 54 is a solid lens group including two solid lenses 58, 60 adjacent the switchable optical element 54 and adjacent the fluid meniscus lens 52. Between the two solid lenses is an optical stop (not shown). One or both of the solid lenses of the solid lens group 58 have a refractive index similar to the refractive index of the first fluid 144 of the switchable optical element 54. The binary zoom optical system is arranged to capture an image of a given object which is an image scene. An image detector 62, for example a charged coupled device (CCD), is arranged to detect and capture an image of the image scene at the optical zoom setting provided by the fluid meniscus lens 52 and the switchable optical element 54 to the given radiation beam carrying the image. In this embodiment the switchable optical element 54 is arranged between the fluid meniscus lens 52 and the image detector 62 and has a maximum optical power range (between its two modes) which is greater that the maximum optical power range of the fluid meniscus lens 52.

Referring to FIG. 10, the binary zoom optical system is in the first zoom mode with the switchable optical element 54 being in the first fluid configuration. In the first fluid configuration the binary zoom optical system has a relatively long first effective focal length which is arranged to provide a relatively high zoom factor. On viewing along the optical axis OA from the fluid meniscus lens 52 to the switchable optical element 54, the fluid meniscus 108 has a concave curvature. In the first zoom mode the optical system has a third field of view $\alpha_3$ corresponding to a relatively high zoom factor provided by the switchable optical element 54 in the first zoom mode.

Referring to FIG. 11, the binary zoom optical system is in the second zoom mode with the switchable optical element 54 being in the second fluid configuration. The fluid switching system 56 switches the first fluid configuration to the second fluid configuration in a similar manner to that described earlier using FIGS. 6 to 9. In the second fluid configuration the switchable optical element 54 has a relatively short second effective focal length which is arranged to provide a relatively low zoom setting. The second effective focal length is shorter than the first effective focal length. On viewing along the optical axis OA from the fluid meniscus lens 52 to the switchable optical element 54, the fluid meniscus 108 has a convex curvature. The binary zoom optical system further comprises a control system 64 which is connected to the first and second meniscus electrodes and is arranged to apply a voltage across the first and second meniscus electrodes in order to control the variable focus by varying the curvature of the fluid meniscus 108 using electrowetting forces.

In the second zoom mode, the optical system has a fourth field of view $\alpha_4$. The fourth field of view $\alpha_4$ of the image captured in the second zoom mode in this example is greater than the third field of view $\alpha_3$ of the image captured in the first zoom mode. Preferably, the optical zoom factor between the two modes is greater than 2, and more preferably greater than 3.

With the binary zoom optical system being in either the first zoom mode or the second zoom mode the variable focus may be varied by the control system 62 applying a different voltage across the first and the second meniscus electrodes to vary the curvature of the fluid meniscus 108. The curvature may be varied such that it is, at one limit of its power range, convex and, at the other limit of its power range, concave.

Figure 12:
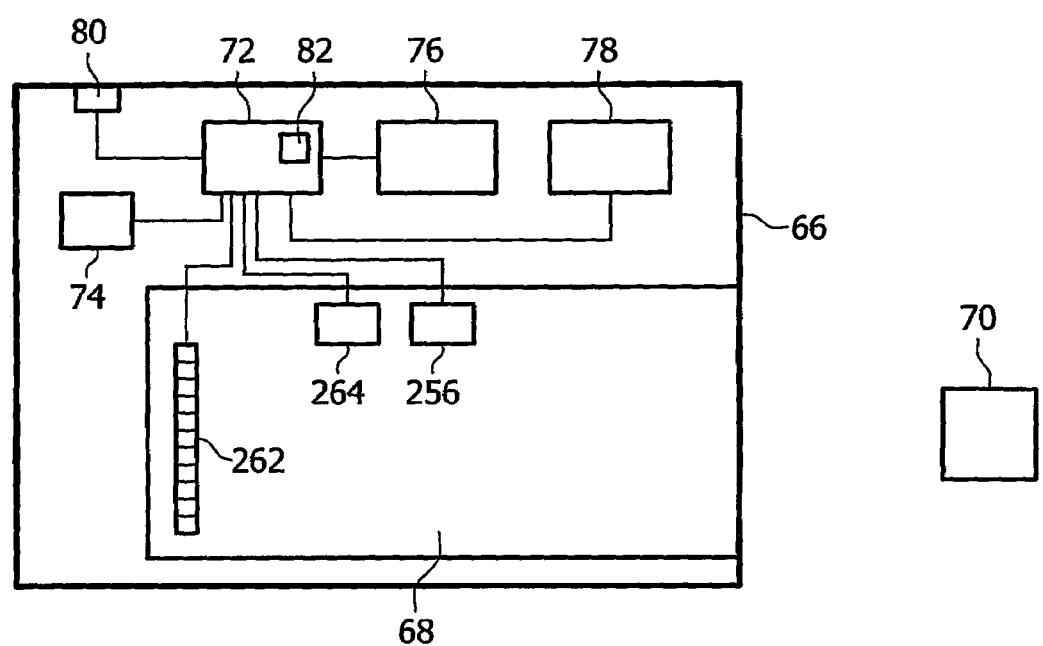
FIG. 12 shows schematically an image capturing apparatus comprising a zoom optical system in accordance with an embodiment of the present invention.

FIG. 12 shows schematically an image capturing apparatus 66 comprising a binary zoom optical system 68 which is similar to the binary zoom optical system of an embodiment of the present invention described previously. Elements and features of the binary zoom optical system 68 are similar to those described before. For such elements and features, similar reference numerals will be used herein, incremented with 200; corresponding descriptions should be taken to apply here also. The image capturing apparatus in this embodiment is a camera and is arranged to record an image of a given object which is an image scene including the feature 70. An apparatus control system 72 is arranged to control functioning of the camera and is connected to the control system 264, the fluid switching system 256, a power supply 74, an image display system 76, an image storage system 78 and a user control system 80. The apparatus control system comprises an image modification system 82.

In operation a user controls a functioning of the camera using the user control system 80. The user is able to select the first zoom mode or the second zoom mode of the binary zoom optical system 68. The apparatus control system 72 controls the fluid switching system 256 so that, as described previously, either the first fluid configuration is selected in the first zoom mode or the second fluid configuration is selected in the second zoom mode. In the camera the first zoom mode is a telephoto zoom mode having a relatively narrow field of view of the image scene and the second zoom mode is a wide-angle zoom mode having a relatively wide field of view of the image scene. Whilst pointing the camera appropriately at the image scene so that the binary zoom optical system 68 may correctly record the image and with the camera in either the telephoto zoom mode or the wide-angle zoom mode, the user views the image display system 76 and selects a specific zoom factor of the image of the image scene to be recorded. In doing so the apparatus control system 72 controls the control system 264 which appropriately varies the curvature of the fluid meniscus as described previously.

The binary zoom optical system allows a relatively high zoom setting for the image to be recorded to be selected with the camera being in the telephoto zoom mode, or a relatively low zoom setting with the camera being in the wide-angle zoom mode. The image modification system 82 is a digital zoom system which is arranged to introduce a variable digital zoom factor to an image captured in the telephoto zoom mode or the wide-angle zoom mode such that further zoom settings may be obtained. This digital zoom factor is introduced, for example to an image captured in the wide-angle zoom mode with the relatively low, or to an image captured in the telephoto zoom mode with the relatively high zoom factor. This allows an image to be recorded which has a zoom setting between the relatively low zoom setting and the relatively high zoom setting. The digital zoom system 82 is also able to introduce a variable digital zoom factor to an image recorded in the telephoto mode and with the relatively high zoom factor. This allows an image to be recorded which has a zoom setting which is higher than the optical zoom setting of the telephoto zoom mode.

Figure 13:
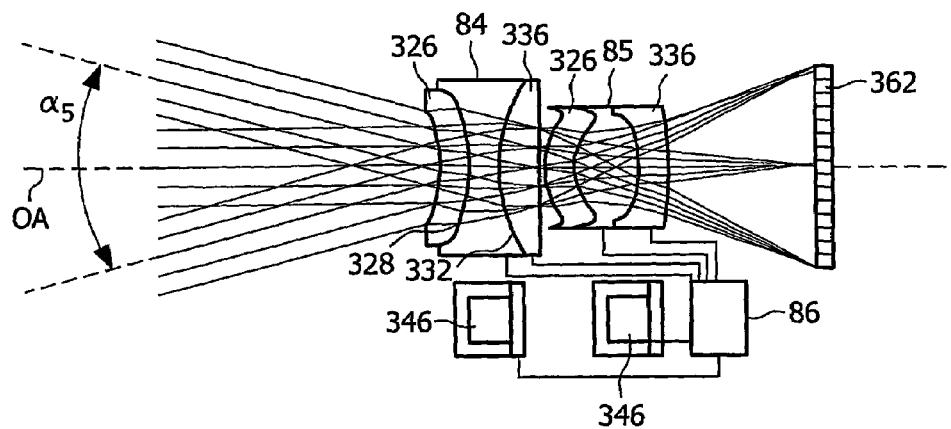
FIG. 13 shows schematically a zoom optical system in a first mode in accordance with a different embodiment of the present invention.
Figure 15:
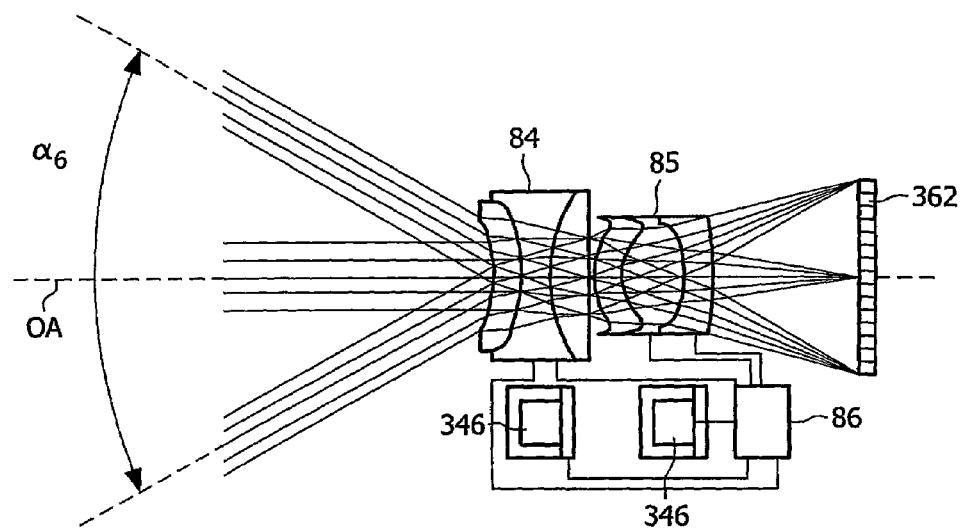
FIG. 15 shows schematically a zoom optical system in a second mode in accordance with the different embodiment of the present invention.

FIG. 13 and FIG. 15 shows schematically a binary zoom optical system used in a camera in accordance with a different embodiment of the present invention. FIG. 13 shows the optical system when in a first zoom mode and FIG. 15 shows the optical system when in a second, different zoom mode.

The binary zoom optical system in this embodiment comprises a switchable optical element 84 and a further switchable optical element 85 which are both similar to the switchable optical element described using FIGS. 6 to 9, and a fluid switching system 86 which is similar to that described earlier for switching the first and second configuration. Elements and features of the switchable optical element 84, the further switchable optical element 85 and the fluid switching system 86 are similar to those described previously. For such elements and features, similar reference numerals will be used herein, incremented with 300; corresponding descriptions should be taken to apply here also.

The switchable optical element 84 has a face of the part 328 of the wavefront modifier 326 which is substantially aspherical and rotationally symmetric about the optical axis OA. The face of the different part 332 of the further wavefront modifier 336 is substantially spherical and rotationally symmetric about the optical axis OA. An opposite face of the further wavefront modifier 336 to the face of the different part 332 is substantially planar.

The further switchable optical element 85 has a face of the part 328 of the wavefront modifier 326 and a face of the different part 332 of the further wavefront modifier 336 which are both substantially aspherical and rotationally symmetric about the optical axis OA. The wavefront modifier 326 of both the switchable optical element 84 and the further switchable optical element 85, and the further wavefront modifier 336 of the further switchable optical element 85 are formed in this example from polycarbonate. The further wavefront modifier 336 of the switchable optical element 84 if formed in this example from S-LAH66 OHARA glass.

The switchable optical element 84 and the further switchable optical element 85 are arranged along the optical axis OA to operate in cooperation with each other to provide at least part of the variable zoom setting of the lens system. A curvature of the faces of both the wavefront modifier 326 and the further wavefront modifier 336 of both the switchable optical element 84 and the further switchable optical element 85 are appropriately arranged to enable this cooperation. An optical stop (not illustrated) lies between the switchable optical element 84 and the further switchable optical element 85.

In this embodiment the salted water of the first fluid 344 has a predetermined first refractive index of approximately 1.38 and a Abbe number of approximately V=50.

The fluid switching system 86 in this embodiment is connected to the common first fluid electrode 350, the second fluid electrode 334 and the third electrowetting electrode 340 of both the switchable optical element 84 and the further switchable optical element 85 and is arranged therefore to switch between the first and second configuration of one or both of the switchable optical element 84 and the further switchable optical element 85.

The binary zoom optical system in this embodiment is arranged to capture an image of a given object which is an image scene. The image detector 362, for example a charged coupled device (CCD), is arranged to detect and capture an image of the image scene at the optical zoom mode provided by the switchable optical element 84 and the further switchable optical element 85, to the given radiation beam carrying the image. The cooperation of the switchable optical element 84 and the further switchable optical element 85 allows the image to be captured at different zoom modes. The binary zoom optical system in this embodiment is arranged to capture images with a fixed level of focus. In this embodiment the further switchable optical element 85 is arranged between the switchable optical element 84 and the image detector 362. A distance along the optical axis from the image detector 362 to an outer face of the wavefront modifier 326 of the switchable optical element 84 is approximately 6.5 mm.

Referring to FIG. 13, the binary zoom optical system is in the first zoom mode with the switchable optical element 84 and the further switchable optical element 85 both being in the first fluid configuration. The fluid switching system 86 is arranged in the first zoom mode to provide the voltage $V_1$ across the common first fluid electrode 350 and the second fluid electrode 334 of both the switchable optical element 84 and the further switchable optical element 85. In the first zoom mode the binary zoom optical system has a relatively long first effective focal length which is arranged to provide a relatively high zoom factor. In the first zoom mode the optical system has a fifth field of view $\alpha_5$ corresponding to a relatively high zoom factor provided by both the switchable optical element 84 and the further switchable optical element 85 being in the first zoom mode. In the first zoom mode the optical system has an aperture with a F# value of approximately 3.8.

Figure 14:
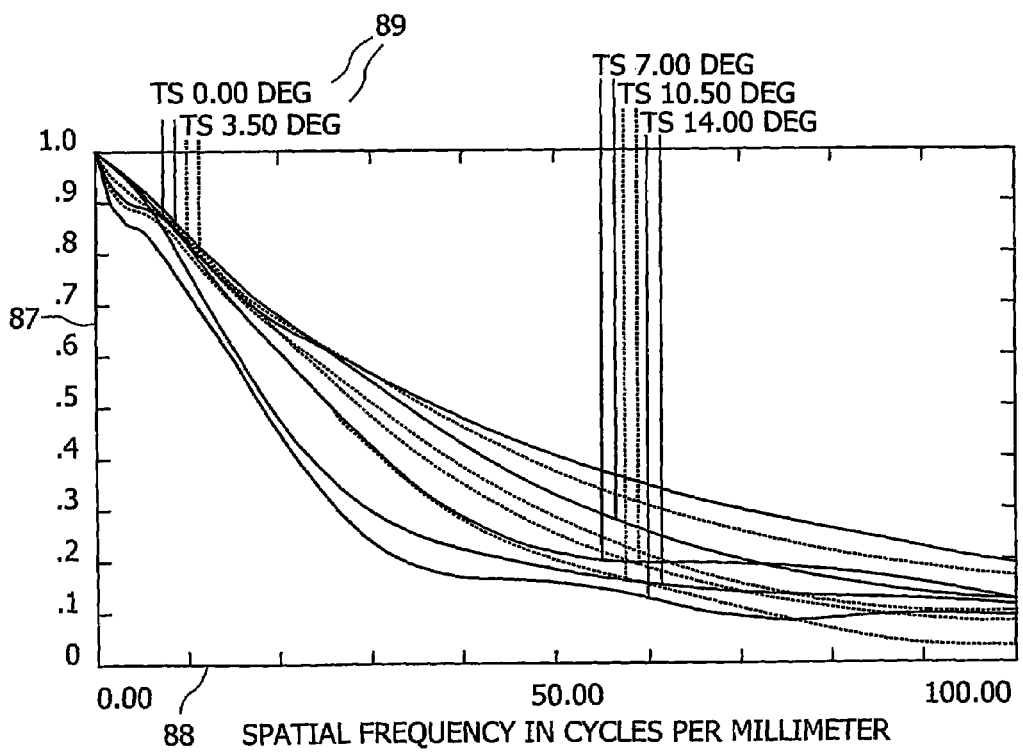
FIG. 14 shows a plot function of characteristics of the zoom optical system in a first mode in accordance with the different embodiment of the present invention.

FIG. 14 shows a plot function of characteristics of the zoom optical system of this embodiment in the first zoom mode. The plot function is a function of a modulation transfer function on a first axis 87 against a spatial frequency on a second axis 88, the second axis being perpendicular the first axis 87. The modulation transfer function indicates an ability of the binary zoom system to resolve an image scene having a certain resolution. The resolution of the image scene, in this example, corresponds to a spatial frequency, in units of cycles per mm, of the image scene. One cycle is a pair of adjacent and parallel lines, one of the lines being black in colour and the other line being white in colour. A higher spatial frequency has a higher number of cycles in 1 mm. A modulation transfer function value of 1 indicates a total ability of the zoom system to accurately resolve the spatial frequency of the image scene within a corresponding captured image. The captured image is therefore of a high quality. A modulation transfer function value of 0 indicates no ability of the zoom system to accurately resolve the spatial frequency. In other words the zoom system in this case is incapable of resolving the resolution of the image scene within the captured image. The captured image is therefore of a poor quality.

A plurality of pairs of plot function lines for the modulation transfer function are shown in FIG. 14. Each plot line of the pair shows the modulation transfer function for a corresponding radiation ray of a pair of radiation rays passing through the zoom system. Each pair of plot lines is labeled with a label 89. One of the radiation rays of the pair has an elliptical cross section with a longer dimension which is horizontal. The other radiation ray of the pair has an elliptical cross section with a longer dimension which is vertical. The 'T' and the 'S' term of each label 89 indicate which plot line, and therefore which radiation ray, has the horizontal long dimension and which plot line, and therefore radiation ray, has the vertical long dimension. The term '0.00 DEG', for example, of a label 89 indicates an angle of incidence relative to the optical axis OA at which each radiation ray of the pair of radiation rays enters the zoom system. In this example a pair of radiation rays having an angle of incidence of 0.00 DEG (i.e. 0.00°) pass through the zoom system coincidentally along the optical axis OA. It can be seen from FIG. 14 that with an increase in the spatial frequency (and therefore correspondingly the resolution) of the image scene, the modulation transfer function (and therefore correspondingly the ability of the optical system to resolve the resolution of the image scene) generally decreases.

Referring to FIG. 15, the binary zoom optical system is in the second zoom mode with the switchable optical element 84 and the further switchable optical element 85 both being in the second fluid configuration. The fluid switching system 86 is arranged in the second zoom mode to provide the voltage $V_2$ across the common first fluid electrode 350 and the third fluid electrode 340 of both the switchable optical element 84 and the further switchable optical element 85. In the second zoom mode the binary zoom optical system has a relatively short second effective focal length which is arranged to provide a relatively low zoom factor. In the second zoom mode the optical system has a sixth field of view $\alpha_6$ corresponding to a relatively low zoom factor provided by both the switchable optical element 84 and the further switchable optical element 85 being in the second zoom mode. Preferably, the optical zoom factor between the first zoom mode and the second zoom mode is, in this example, approximately 2. In the second zoom mode the optical system has an aperture with a F# value of approximately 2.8.

Figure 16:
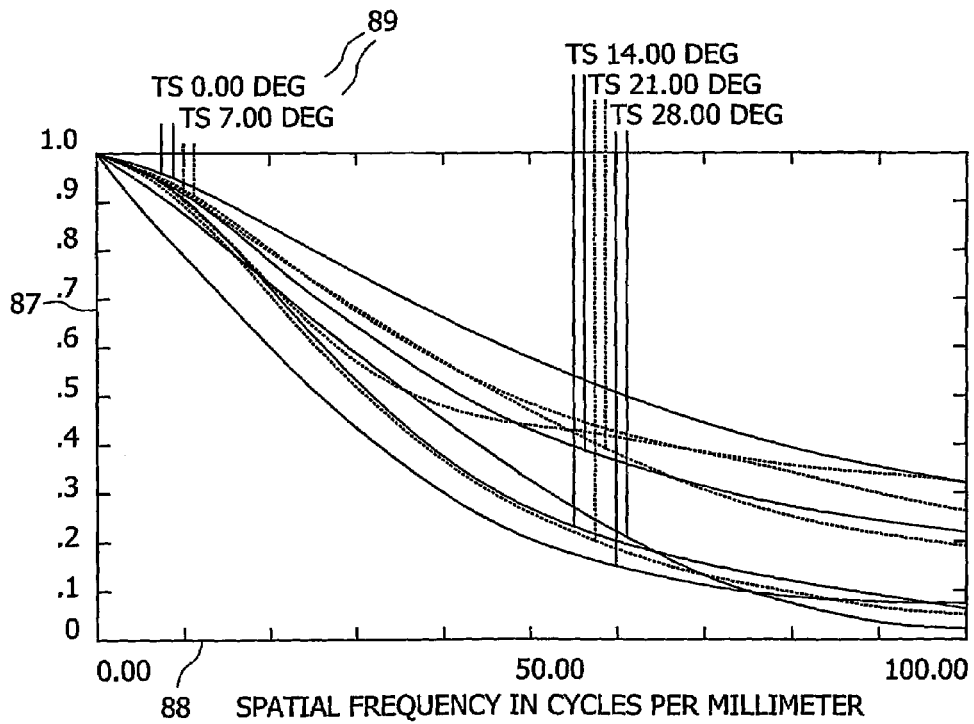
FIG. 16 shows a plot function of characteristics of the zoom optical system in a second mode in accordance with the different embodiment of the present invention.

FIG. 16 shows a plot function of characteristics of the zoom optical system of this embodiment in the second zoom mode. The plot function is a function of a modulation transfer function on the first axis 87 against a spatial frequency on the second axis 88. The description of features of this modulation transfer function are similar to those as described for FIG. 14 and should be taken to apply here also.

The binary zoom system of this embodiment may be incorporated into the image capturing apparatus as described earlier with reference to FIG. 12. Such an image apparatus including the binary zoom system of this embodiment may be a low-resolution camera in which the image detector 362 is a VGA sensor comprising approximately 640×480 pixels, each pixel having a size of approximately 4.3 μm. This low-resolution camera captures images at a fixed focus and therefore does not comprise a variable focus lens nor a control system for controlling a variable focus. The first zoom mode is a telephoto zoom mode having a relatively narrow field of view of the image scene and the second zoom mode is a wide-angle zoom mode having a relatively wide field of view of the image scene.

In an embodiment of the present invention described previously the binary zoom optical system comprises a lens which is arranged to provide a continuously variable focus and is a fluid meniscus lens. In a different embodiment of the present invention the lens which is arranged to provide the continuously variable focus is a solid lens. The lens is arranged to be moved to different spatial positions relative to the switchable optical element along the optical axis OA. The lens itself has a fixed focal power. An alternative control system to that described earlier and comprised by the binary zoom optical system is arranged to control the variable focus continuously by varying the spatial positions of the lens. Different spatial positions are obtained by for example a motor driving a geared system to move the lens along the optical axis OA. By the control system appropriately varying the spatial position of the lens on the optical axis OA, it is possible to vary a focal power and a zoom factor, similarly to that previously described, of an image of a given object captured by the binary optical system.

It is envisaged that, in alternative embodiments of the invention, the lens array comprises a plurality of solid lenses which can independently be moved to different spatial positions along the optical axis OA using mechanical actuators.

In further alternative embodiments of the invention, the lens which is arranged to provide the continuously variable focus is a liquid crystal lens, which obviates the need for a mechanical system to move lens components.

It is further envisaged that the different fluids of the fluid meniscus lens and the switchable optical element(s) may be different to those described and may each have a different refractive index. It is also envisaged that the first fluid and the second fluid of the switchable optical element(s) may alternatively be gaseous and a liquid respectively, or that the first and second fluids are both liquids.

It is envisaged also that materials from which elements, for example the wavefront modifiers and the electrodes, of the binary zoom optical system are formed may be different to those described. Different materials may be selected according to certain properties, for example a wavefront modifier material of the switchable optical element(s) must not be soluble in the first fluid or the second fluid.

It is further envisaged that the face of the part and/or the different part of the switchable optical element(s) has a different aspherical shape or are alternatively spherical. It is additionally envisaged that the face of the part or different part may comprise a non-periodic structure (NPS) or a diffraction grating.

The switchable optical element(s) described operates in a circulatory manner through the fluid system. It is envisaged that alternative constructions of the switchable optical element(s) in relation to an arrangement and fluid flow during a fluid configuration transition of the first fluid and the second fluid may be used, for example non-circulatory fluid flow between the main chamber and one or more fluid reservoirs may be used.

It is envisaged in alternative embodiments that the switchable optical element(s) described is differently constructed and that the wavefront modifier comprises a further fluid electrode similar to the second fluid electrode of the cover plate comprising the further wavefront modifier. The further fluid electrode is electrically connected to the second fluid electrode such that the applied voltage $V_1$ is applied across the common first fluid electrode, the second fluid electrode and the further fluid electrode in the first fluid configuration. It is additionally envisaged that the part of the wavefront modifier is covered in a hydrophobic fluid contact layer formed for example of Teflon™ AF1600. One surface of this layer is exposed to the interior of the chamber. In this envisaged embodiment the construction of the switchable optical element(s) allows a more efficient movement of fluid between the chamber and the conduit during switching between the first and the second fluid configuration.

In different possible embodiments of the switchable optical element(s), the fluid switching system may be differently arranged to switch between the first and the second fluid configurations using mechanisms which do not involve electrowetting forces, for example a mechanical pumping mechanism.

Note further that a conventional zoom optical system comprising an array of lenses may be combined with the binary zoom optical system of the present invention to allow images to be captured having further different zoom settings.

It is envisaged that an alternative embodiment to the embodiment of the present invention comprising two switchable optical elements may also comprise separate lens elements which provide a fixed focus of the zoom system.

It is envisaged that further embodiments of the present invention which provide either a fixed focus or a variable focus may include two or more switchable optical elements of embodiments described earlier.

In the described embodiment comprising a switchable optical element and a further switchable optical element, a first zoom mode and a second zoom mode are provided with either the cavity of both switchable optical elements being filled with the first fluid, or both cavities being filled with the second fluid. It is further envisaged that further zoom modes may be obtained with a cavity of one switchable optical element being filled with the first fluid and the cavity of the further switchable optical element being filled with the second fluid, or vice versa.

It is further envisaged that alternative zoom systems of the present invention may have a difference in a zoom factor between at least a first and a second zoom mode of a different value.

The binary zoom optical system of the present invention is described for inclusion and operation in an image capturing apparatus such as a camera. Inclusion of the binary zoom optical system in various image capturing devices is envisaged, for example a mobile telephone which includes a camera, or other devices which include a camera.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A zoom optical system comprising a lens system which is arranged to provide a variable zoom setting for a beam of radiation, wherein the lens system comprises a switchable optical element having a first mode and a second mode, wherein the switchable optical element includes a first fluid, a second fluid, a chamber fluidly connected via two openings of the chamber to a conduit, and a wavefront modifier having a part through which said radiation beam is arranged to pass, wherein in the first mode the switchable optical element has a first fluid configuration in which said part is substantially covered by the first fluid, and in the second mode the switchable optical element has a second, different, fluid configuration in which said part is substantially covered by the second fluid, the first fluid substantially filling the chamber in the first mode and the second fluid substantially filling the chamber in the second mode.

2. The zoom optical system according to claim 1, wherein the first fluid is a liquid and the second fluid is gaseous.

3. The zoom optical system according to claim 1, wherein the switchable optical element comprises a common first fluid electrode, a second, different, fluid electrode and a third, different, fluid electrode, wherein in the first fluid configuration the switchable optical element is arranged to provide switchable electrowetting forces by applying a first voltage across said first and second fluid electrodes, and in the second fluid configuration the switchable optical element is arranged to provide different switchable electrowetting forces by applying a second, different, voltage across said first and third fluid electrodes.

4. The zoom optical system according to claim 1, wherein the switchable optical element comprises a further wavefront modifier having a different part through which said radiation beam is arranged to pass, wherein the wavefront modifier is adapted to perform a first wavefront modification and the further wavefront modifier is adapted to perform a second, different, wavefront modification which is arranged to complement the first wavefront modification.

5. The zoom optical system according to claim 1, wherein the wavefront modifier has a face, wherein said face is substantially spherical or aspherical, and said part is on said face.

6. The zoom optical system according to claim 1, wherein said lens system comprises a further switchable optical element, said further switchable optical element being arranged to operate in cooperation with said switchable optical element to provide at least part of said variable zoom setting of the lens system.

7. The zoom optical system according to claim 1, wherein said first lens is a fluid meniscus lens which comprises different fluids separated by a fluid meniscus having a curvature, wherein the optical system further comprises a control system and the variable focus comprises variations in the fluid meniscus curvature, wherein the control system is arranged to control the variable focus using meniscus electrowetting forces.

8. The_zoom optical system according to claim 7, wherein the fluid meniscus lens further comprises a first electrode and a second, different, electrode and the control system is arranged to apply a voltage across said first and second meniscus electrodes to provide said meniscus electrowetting forces.

9. The zoom optical system according to claim 1, wherein the lens system comprises a solid lens capable of being arranged at varying spatial positions relative to the switchable optical element.

10. The zoom optical system according to claim 1, wherein said lens system comprises a liquid crystal lens having a varying optical power.

11. An image capturing apparatus comprising the zoom optical system according to claim 1, wherein with the optical system being in said first mode, the apparatus is adapted to capture an image with a first zoom setting, and with the optical system being in said second mode, said apparatus is adapted to capture an image with a second, different, zoom setting.

12. The image capturing apparatus according to claim 11, wherein said image capturing apparatus further comprises a digital zoom system arranged to introduce a digital zoom factor to an image captured in the first mode and/or an image captured in the second mode.

13. The zoom optical system of claim 1, wherein the second fluid substantially fills the conduit in the first mode and the first fluid substantially fills the conduit in the second mode.

* * * * *